(12) United States Patent
Thayer

(10) Patent No.: US 11,667,396 B2
(45) Date of Patent: Jun. 6, 2023

(54) METHODS AND APPARATUS TO STABILIZE AND RECOVER UNMANNED AERIAL VEHICLES (UAVS)

(71) Applicant: Insitu, Inc., Bingen, WA (US)

(72) Inventor: Wayne Scott Thayer, White Salmon, WA (US)

(73) Assignee: Insitu, Inc., Bingen, WA (US)

( * ) Notice: Subject to any disclaimer, the term of this patent is extended or adjusted under 35 U.S.C. 154(b) by 525 days.

(21) Appl. No.: 16/741,274

(22) Filed: Jan. 13, 2020

(65) Prior Publication Data
US 2021/0214100 A1 Jul. 15, 2021

(51) Int. Cl.
*B64F 1/02* (2006.01)
*B64C 39/02* (2023.01)
*B64U 70/30* (2023.01)

(52) U.S. Cl.
CPC ............ *B64F 1/029* (2020.01); *B64C 39/024* (2013.01); *B64U 70/30* (2023.01)

(58) Field of Classification Search
CPC ..... B64F 1/027; B64F 1/029; B64C 2201/182
See application file for complete search history.

(56) References Cited

U.S. PATENT DOCUMENTS

| | | | |
|---|---|---|---|
| 2009/0224097 A1* | 9/2009 | Kariv | B64F 1/029 244/110 F |
| 2011/0233329 A1* | 9/2011 | McGeer | B64D 37/00 244/110 F |
| 2012/0223182 A1* | 9/2012 | Gilchrist, III | B64F 1/0297 244/110 F |
| 2013/0082137 A1* | 4/2013 | Gundlach | B64C 39/024 244/110 G |
| 2015/0129716 A1* | 5/2015 | Yoffe | B64F 1/0297 244/110 C |
| 2015/0239578 A1* | 8/2015 | McGeer | B64F 1/04 901/31 |
| 2016/0114906 A1* | 4/2016 | McGeer | B64C 39/024 244/114 R |
| 2016/0144980 A1* | 5/2016 | Kunz | B64F 1/029 244/110 C |
| 2018/0086481 A1* | 3/2018 | Briggs | B64F 1/0299 |

OTHER PUBLICATIONS

"Meet Our Heroes: The Medical Drone Delivery Pilot," Zipline, Accessed Oct. 14, 2019, Retrieved from the Internet: <URL:https://flyzipline.com/about/#actions> (7 pages).

* cited by examiner

*Primary Examiner* — Richard Green
*Assistant Examiner* — Arfan Y. Sinaki
(74) *Attorney, Agent, or Firm* — Hanley, Flight & Zimmerman

(57) ABSTRACT

Methods and apparatus to stabilize and recover unmanned aerial vehicles (UAVs) are disclosed. A disclosed example apparatus includes a capture line, a mast to support the capture line for contact with the UAV, and a braking stabilizer. The braking stabilizer includes a flexible stem, a body at a distal end of the stem, where the body defines first and second flexible posts, and a filament extending between the first and second posts to contact and engage a hook of the UAV.

27 Claims, 11 Drawing Sheets

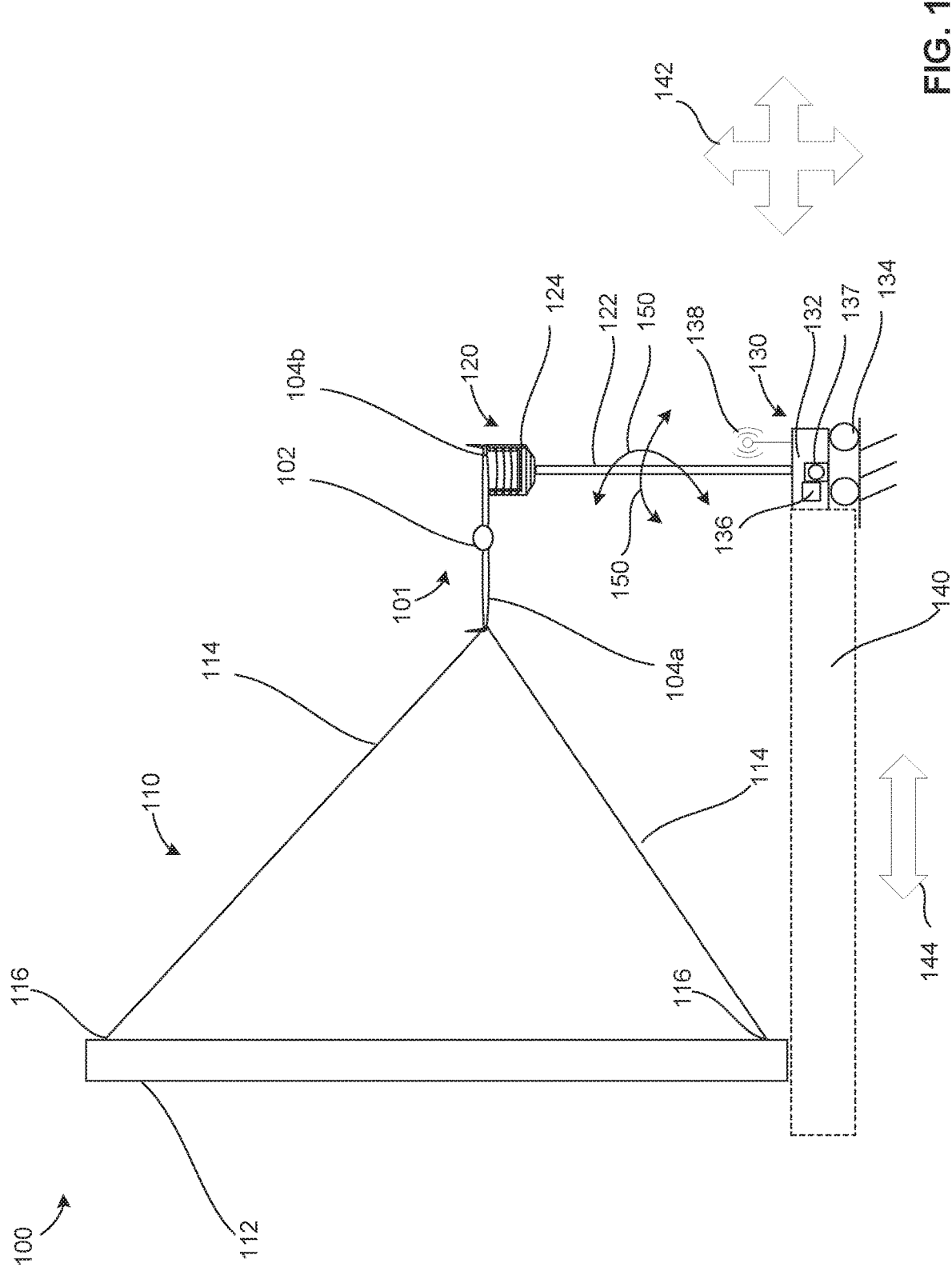

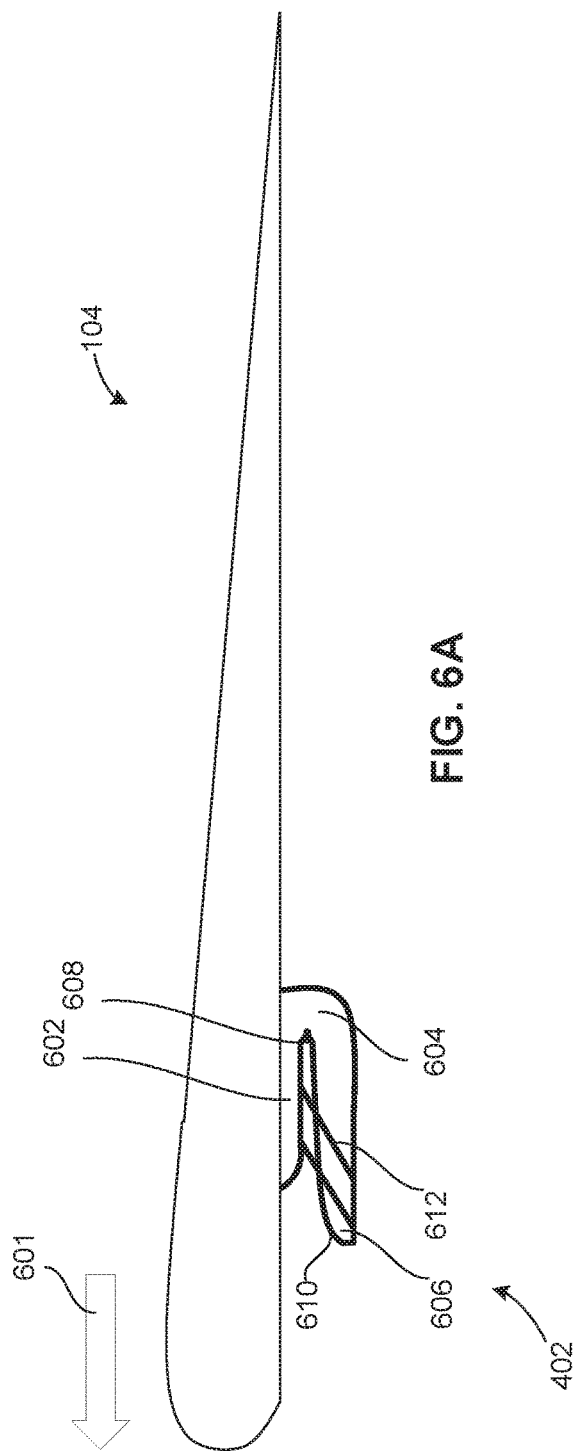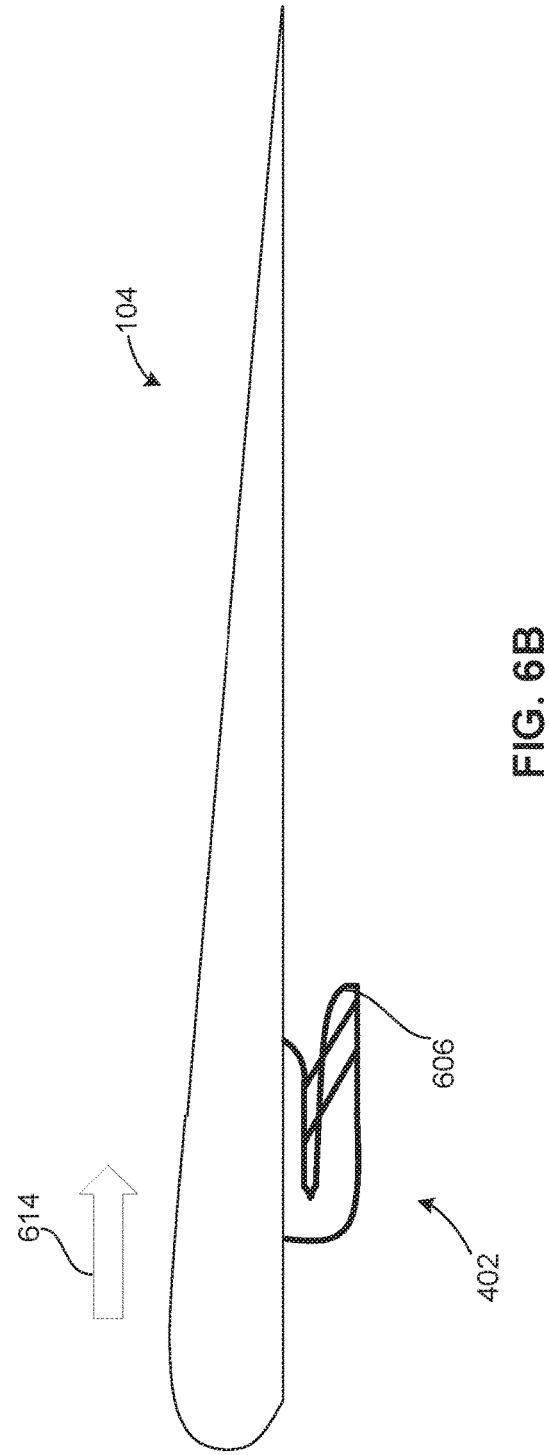

METHODS AND APPARATUS TO STABILIZE AND RECOVER UNMANNED AERIAL VEHICLES (UAVS)

FIELD OF THE DISCLOSURE

This disclosure relates generally to aircraft and, more particularly, to methods and apparatus to recover unmanned aerial vehicles (UAVs).

BACKGROUND

In recent years, unmanned aerial vehicles (UAVs) or drones have been used to fly significant distances to transport payloads (e.g., packages, supplies, equipment, etc.) or gather information. Some UAVs land on runways while others are captured in flight by UAV recovery systems. Capturing UAVs without the use of a runway enables greater flexibility in recovery locations. In particular, a UAV can be recovered in an unprepared area or on relatively smaller ships or other vessels or vehicles.

SUMMARY

An example apparatus includes a capture line, a mast to support the capture line for contact with the UAV, and a braking stabilizer. The braking stabilizer includes a flexible stem, a body at a distal end of the stem, where the body defines first and second flexible posts, and filament extending between the first and second posts to contact and engage a hook of the UAV.

An example braking stabilizer for stabilization of an unmanned aerial vehicle (UAV) during recovery thereof includes a flexible stem, a body at a distal end of the stem, flexible first and second posts of the body extending along a longitudinal direction of the flexible stem, and a filament extending between the first and second posts to contact a hook of the UAV.

An example method of recovering an unmanned aerial vehicle (UAV) includes moving the UAV to contact a capture line, contacting a body of a braking stabilizer with the UAV, where the body includes first and second flexible posts, and engaging a hook of the UAV with a filament of the braking stabilizer to capture the UAV, where the filament extends between the first and second posts.

An example non-transitory machine readable medium comprising instructions, which when executed, cause a processor to at least determine a position of an unmanned aerial vehicle (UAV), determine a position of a braking stabilizer, where the braking stabilizer includes a flexible stem and a body having first and second flexible posts, and where the first and second flexible posts include a filament extending therebetween, and direct movement of at least one of the UAV or the braking stabilizer to bring the UAV in contact with the body so that a hook of the UAV is captured by the filament after the UAV contacts a capture line.

An example system includes a capture line to engage a first wing of an unmanned aerial vehicle, and a braking stabilizer to engage a second wing of the UAV, where the second wing is opposite the first wing. The braking stabilizer includes a flexible stem extending from a platform, and a body formed proximate to an end of the flexible stem, where the body has at least one feature to engage the second wing.

BRIEF DESCRIPTION OF THE DRAWINGS

FIG. 1 depicts an unmanned aerial vehicle (UAV) recovery system in accordance with teachings of this disclosure.

FIGS. 6A and 6B depict example capture hooks that can be implemented in examples disclosed herein.

Figure 2A:
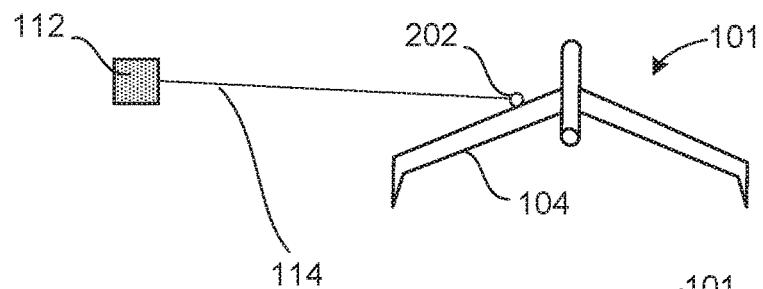
FIGS. 2A-2D depict an example time-based sequence corresponding to recovery of a UAV for which examples disclosed herein can be applied.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Methods and apparatus to stabilize and recover unmanned aerial vehicles (UAVs) are disclosed. Some known UAV recovery systems employ a capture line to recover a UAV. In particular, the capture line can be suspended vertically to contact a wing of the UAV and, subsequent to contact of the capture line with the wing of the UAV, the capture line moves along a length of the wing until the capture line is moved to a distal end of the wing. As a result, the UAV typically remains entangled with and suspended by the capture line, thereby allowing the residual kinetic energy and wind to cause movements that can damage the UAV and/or the recovery system. Further, the UAV can be suddenly jerked or moved by a recoil of the recovery line, which can result in damage and/or degradation of the UAV.

Examples disclosed herein enable a reduction in forces applied to a UAV during a capture process based on a single capture line, thereby reducing (e.g., eliminating) potential damage to the UAV and, thus, increasing a longevity of the UAV. Examples disclosed herein stabilize the UAV by implementing a braking stabilizer in combination with the capture line. The braking stabilizer includes a body (e.g., a flexible body) attached to a flexible stem. The body defines first and second flexible posts. The first and second posts include at least one filament (e.g., a grid of filaments, a pattern of filaments, etc.) extending therebetween. During recovery of the UAV with the capture line, an external surface (e.g., an upper or lower wing surface, etc.) of the UAV contacts the body, thereby causing a flexure of the body along with the stem to aid in decelerating and/or restraining the UAV. In other words, a motion dampening interface is created between the UAV and the braking stabilizer while the UAV engages the capture line. In turn, a hook of the UAV contacts and engages the aforementioned at least one filament, thereby restraining the UAV and preventing damage thereto.

In some examples, the body defines a relatively flat surface (e.g., resembling a fly swatter and/or a perforated fly swatter) to contact the external surface of the UAV. In some examples, at least one of the first post, the second post, or the body is at least partially composed of an elastomer. Additionally or alternatively, at least one of the first or second posts includes a lead-in chamfer. In some examples, the first and second posts and/or the body define a generally c-shaped braking stabilizer.

In some examples, a movable base (e.g., a motorized movable base) is used to position the braking stabilizer relative to a mast supporting a capture line and/or a flight path (e.g., a predicted flight path) of the UAV. In some such examples, the movable base is wheeled and movement of the movable base is coordinated with movement of the UAV. Additionally or alternatively an arm (e.g., a movable arm, telescoping arm, etc.) is operatively coupled between the aforementioned mast and the braking stabilizer to vary a position of the braking stabilizer.

As used herein, the term "flexible" refers to a characteristic of a component and/or device to elastically displace and/or bend significantly with little or no plastic deformation. As used herein, the term "filament" can refer to a string, a rope, a cable, a string, a braided cable, a bungee cable, a spring-loaded cable and/or a filament strand, etc.

FIG. 1 depicts an unmanned aerial vehicle recovery system 100 in accordance with teachings of this disclosure. The UAV recovery system 100 is implemented to capture an aircraft 101, which includes a fuselage 102 with wings 104 (hereinafter 104a, 104b, etc.) attached thereto. The UAV recovery system 100 of the illustrated example includes a line capture portion 110. The example line capture portion 110 includes a mast (e.g., a recovery pole, a vertical support pole, a boom, etc.) 112 and a capture line (e.g., a vertical capture rope, a tether capture, etc.) 114 supported at ends 116 of the mast 112. The example UAV recovery system 100 also includes a braking stabilizer 120, which includes a flexible stem 122 and a flexible body 124 attached to a distal end of the flexible stem 122. In some examples, the stem 122 is operatively coupled to a base (e.g., a movable base, a motorized movable base, an automated movable base, etc.) 130, which includes a body (e.g., a stabilizing body, a support body, etc.) 132 and wheels 134. In some examples, the UAV recovery system 100 includes a movement controller 136, an actuator/motor 137 and a transceiver 138. Additionally or alternatively, an arm (e.g., a side boom, a movable extension, a telescoping extension, a movable arm, a telescoping arm, etc.) 140 extends between the mast 112 and the stem 122.

To capture the UAV 101 during flight, the wing 104a is brought into contact with the capture line 114. In particular, the UAV 101 is flown toward the capture line 114 to cause the wing 104a to contact the capture line 114. As a result of an impact between the wing 104a and the capture line 114, the UAV 101 is decelerated as the capture line 114 is moved and/or stretched. However, momentum of the UAV 101 and kinetic energy stored in the capture line 114 can impart forces (e.g., recoil forces) to the UAV 101 that can damage and/or degrade the UAV 101.

To stabilize the UAV 101, concurrent and/or subsequent to the wing 104a contacting the capture line 114, the wing 104b of the UAV 101 is directed to contact the flexible body 124 of the braking stabilizer 120 and, as a result, the UAV 101 is stabilized and retained by the braking stabilizer 120, as will be discussed in greater detail below in connection with FIGS. 2A-10. In this example, the braking stabilizer 120 and/or the flexible body 124 is positioned relative to the capture line 114 to supplement and/or augment effectiveness of the capture line 114. In other words, the braking stabilizer 120 dissipates forces and/or momentum associated with recovering the UAV 101 from flight by the capture line 114, thereby preventing the UAV 101 from damage and/or degradation.

In some examples, the movable base 130 and/or the stem 122 supporting the flexible body 124 is movable along directions generally indicated by arrows 142. In some such examples, the movement controller 136 may direct the actuator/motor 137 to control movement of the wheels 134 and, thus, move and/or orient the braking stabilizer 120 for recovery of the UAV 101. Movement of the braking stabilizer 120 can be based on signals received at the transceiver 138 (e.g., communication signals pertaining to coordination of movement of the braking stabilizer 120 with the UAV 101). In examples in which the side boom 140 is implemented, the side boom 140 may displace and/or telescope in directions generally indicated by a double arrow 144 (e.g., based on control signals from the movement controller 136). In some examples, the stem 122 and/or the flexible body 124 are caused to rotate and/or tilt (e.g., via an actuator, a rotational actuator, a motor, etc.), as generally indicated by arrows 150, to facilitate capture of the UAV 101.

FIGS. 2A-2D depict an example time-based sequence corresponding to recovery of the UAV 101 for which examples disclosed herein can be applied. In particular, FIGS. 2A-2D depict recovery of the UAV 101 from a top view perspective. Turning to FIG. 2A, the wing 104 of the UAV 101 is shown contacting the capture line 114 supported by the mast 112 at a contact interface 202.

Figure 2B:
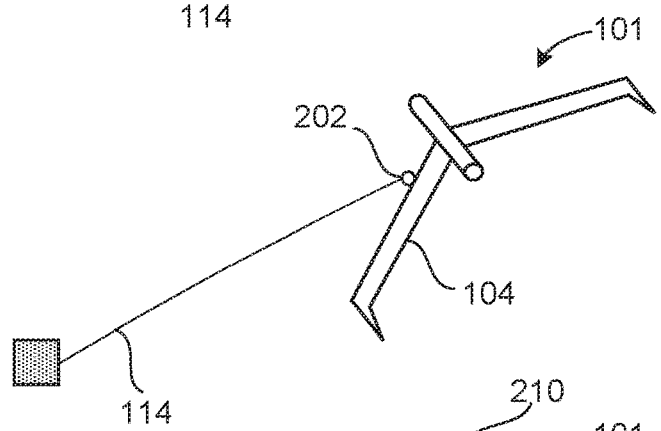

FIG. 2B depicts the UAV 101 as the UAV 101 begins to rotate about the contact interface 202. In particular, inertia of the UAV 101 causes rotation thereof subsequent to an impact between the wing 104 and the capture line 114. In other words, deceleration at the wing 104 in combination with forward momentum of the UAV 101 results in rotation (e.g., spinning) of the UAV 101 about the contact interface 202.

Figure 2C:
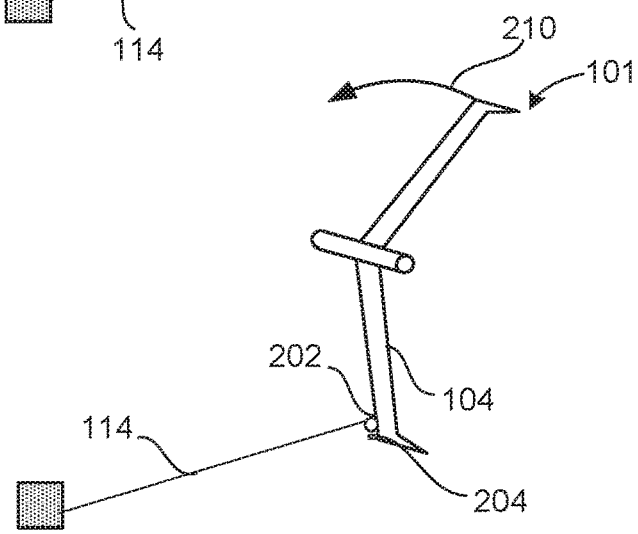

Turning to FIG. 2C, the contact interface 202 between the wing 104 and the capture line 114 has moved toward a hook 204 at a distal end of the wing 104. As a result, the capture line 114 is retained by the hook 204 and, thus, is prevented from moving relative to the wing 104. Due to the capture line 114 being retained and/or restricted by the hook 204, the UAV 101 is caused to rotate, as generally indicated by an arrow 210.

Figure 2D:
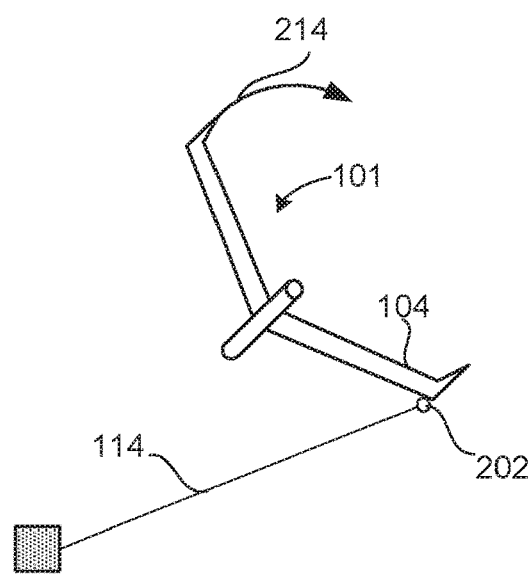

FIG. 2D depicts the UAV 101 during a recoil action (e.g., recoil swing). In particular, the wing 104 remains in contact with the capture line 114 at the contact interface 202. However, energy associated with the capture line 114 and/or the UAV 101 causes the UAV 101 to rotate in a direction opposite to that shown in FIG. 2C, as generally indicated by an arrow 214. In some known implementations, the UAV 101 drops rapidly to the ground after this recoil action. In contrast, examples disclosed herein can stabilize and effectively reduce spinning of the UAV 101 during the recoil action. Accordingly, examples disclosed herein can be applied to either the reaction rotation shown in FIG. 2C or the recoil rotation shown in FIG. 2D. Additionally or alternatively, examples disclosed herein can be implemented for use during an initial contact of the capture line 114 with the wing 104.

Figure 3:
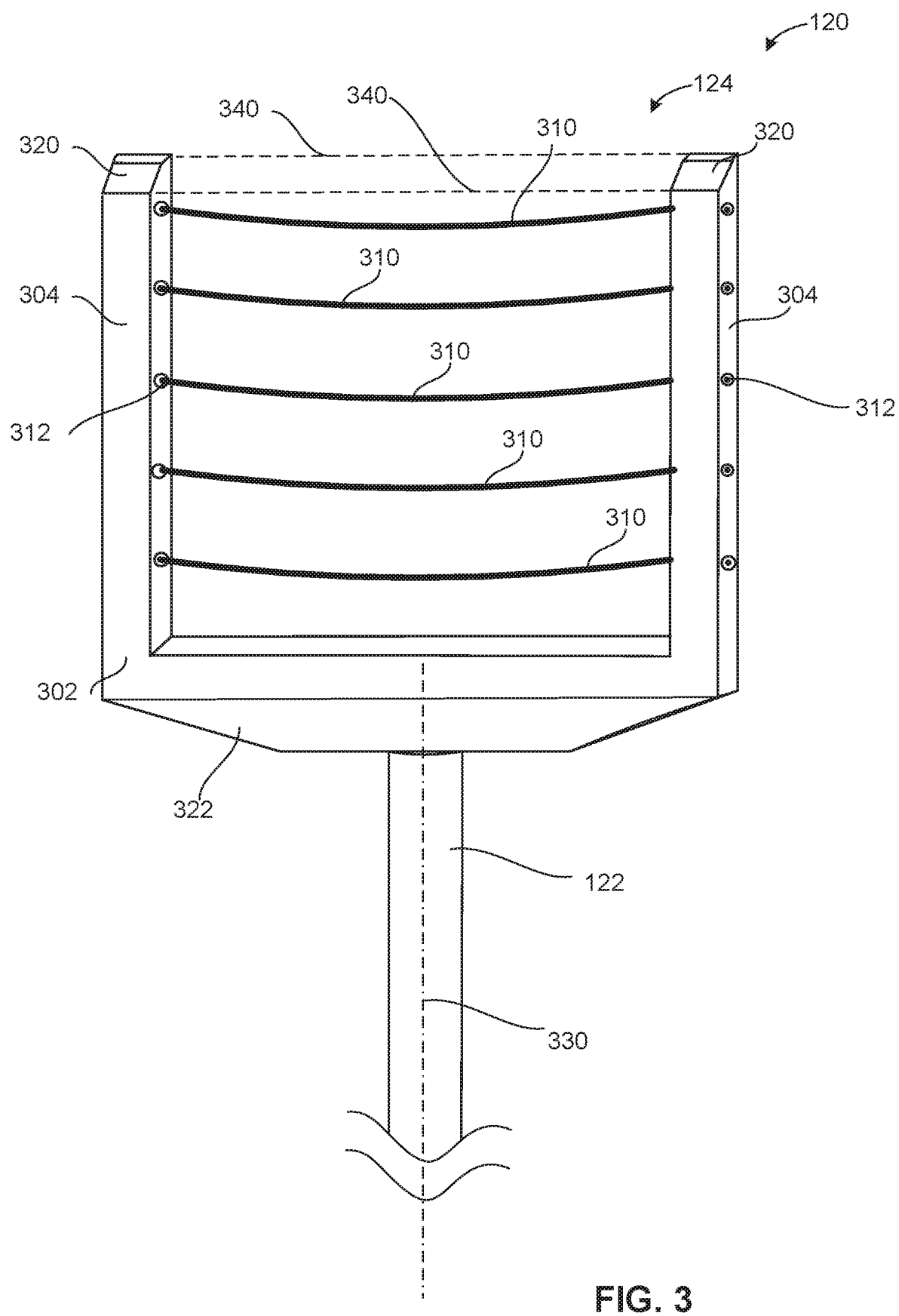
FIG. 3 is a detailed view of an example braking stabilizer of the UAV recovery system of FIG. 1.

FIG. 3 is a detailed view of the example braking stabilizer 120 of the UAV recovery system 100 of FIG. 1. The braking stabilizer 120 of the illustrated example includes the aforementioned flexible body 124 attached to a distal end of the flexible stem 122. In this example, the body 124 includes a base 302 with posts 304 extending therefrom along a direction generally away from the stem 122 (e.g., extending along a longitudinal direction associated with the stem 122). Further, the example flexible body 124 includes multiple filaments (e.g., capture lines, filaments arranged in parallel, filaments arranged as a grid, etc.) 310 extending between (e.g., extending horizontally in the view of FIG. 3) attachment points 312 of the posts 304. In some examples, the posts 304 include chamfers (e.g., lead-in chamfers) 320 at respective distal ends. These chamfers 320 can facilitate initial contact of the UAV 101 with the flexible body 124 and/or general movement of the braking stabilizer 120 as the flexible body 124 contacts the UAV 101. Additionally or alternatively the base 302 exhibits a taper 322 to facilitate flexible movement of the braking stabilizer 120 and/or the posts 304.

As will be discussed in greater detail below in connection with FIGS. 4A and 4B, the flexure of the stem 122 and the posts 304 enables the flexible body 124 of the braking stabilizer 120 to contact the UAV 101 for capture and stabilization of the UAV 101. In particular, when a surface of the UAV 101 contacts the flexible body 124 and/or the posts 304, a dampening interface is defined therebetween to decelerate and/or stabilize the UAV 101. In the illustrated example, the posts 304 extend from the base 302 to enable a relatively large degree of flexure of the flexible body 124 during contact with the UAV 101.

To enable additional flexibility to that provided by the stem 122, the flexible body 124 and/or the base 302 is relatively thin (e.g., 3.0-12.5 mm) depending on specific application needs (e.g., aircraft weight, anticipated aircraft recovery speed, capture line characteristics, etc.). Further, implementation of the posts 304 enables a relatively large amount of overall flexure of the braking stabilizer 120. Particularly, the base 302 in combination with the posts 304 and the stem 122, can exhibit a relatively large amount of flexure during contact with the UAV 101.

In some examples, the posts 304 extend generally along a direction defined by a center axis 330 of the stem 122, thereby defining a goal post-like shape or c-shaped portion. In some other examples, the posts 304 are angled from the center axis 330 (e.g., the posts 304 define a v-shaped portion). In some examples, at least one of the base 302, the posts 304, the filaments 310 and/or the stem 122 is at least partially composed of an elastomeric material (e.g., a polymer material). In some examples, the filaments 310 are at least partially composed of metal (e.g., metal wires, metal strands, metal cables, a braided metal wire, etc.). In some examples, only one of the filaments 310 extends between the posts 304.

In some other examples, the posts 304 are not implemented and the base 302 is implemented as a relatively flat surface or plate resembling a fly swatter, for example, as generally indicated by dotted outlines 340. In some such examples, the base 302 may include apertures (e.g., a grid of perforations, which may be round, rectangular or polygonal, etc.) for capture and/or retention of a portion of the UAV 101. These apertures may be used to retain a hook or other protrusion of the UAV 101.

Figure 4A:
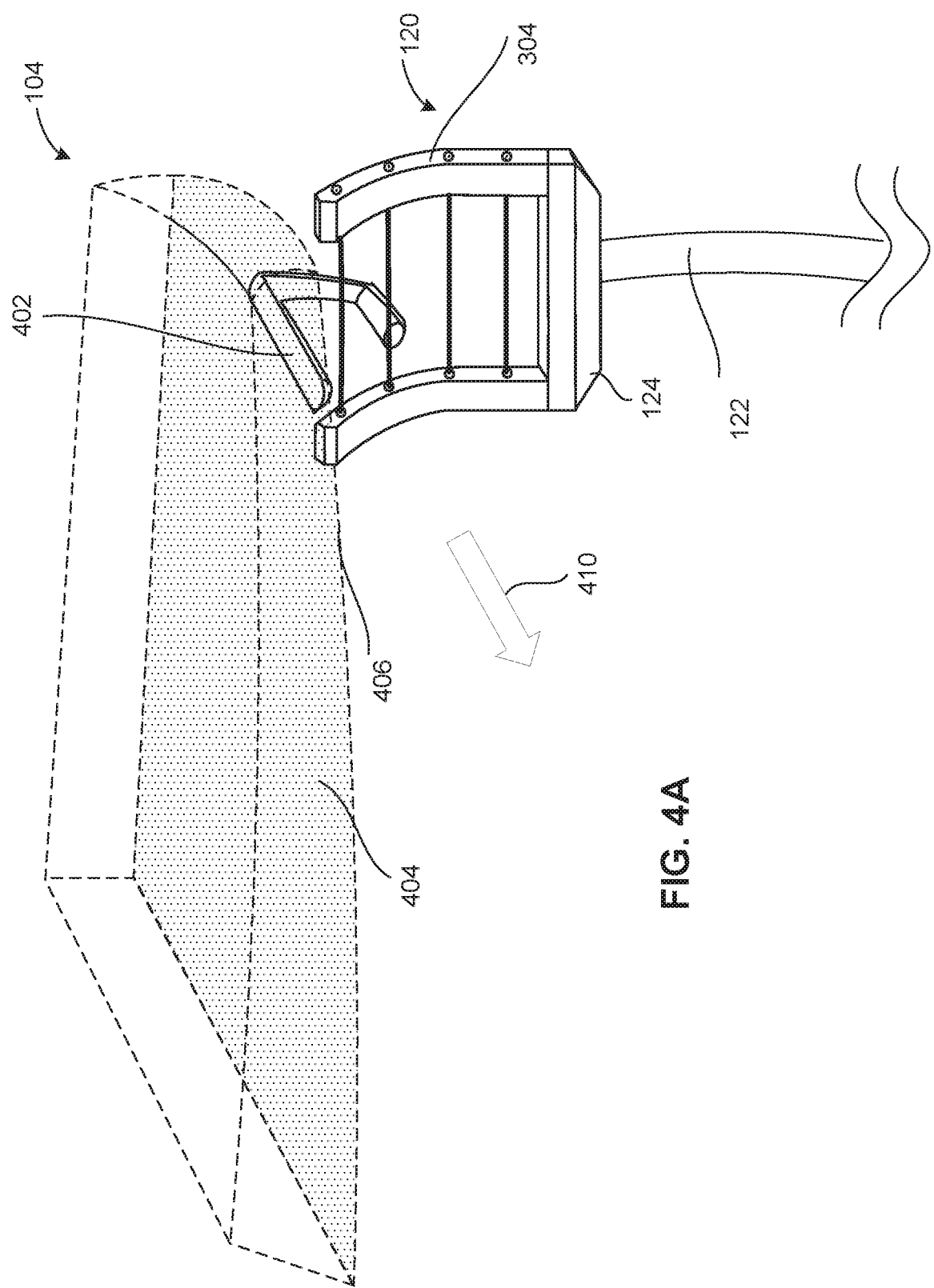
FIGS. 4A and 4B depict use of the example braking stabilizer shown in FIGS. 1 and 3.
Figure 4B:
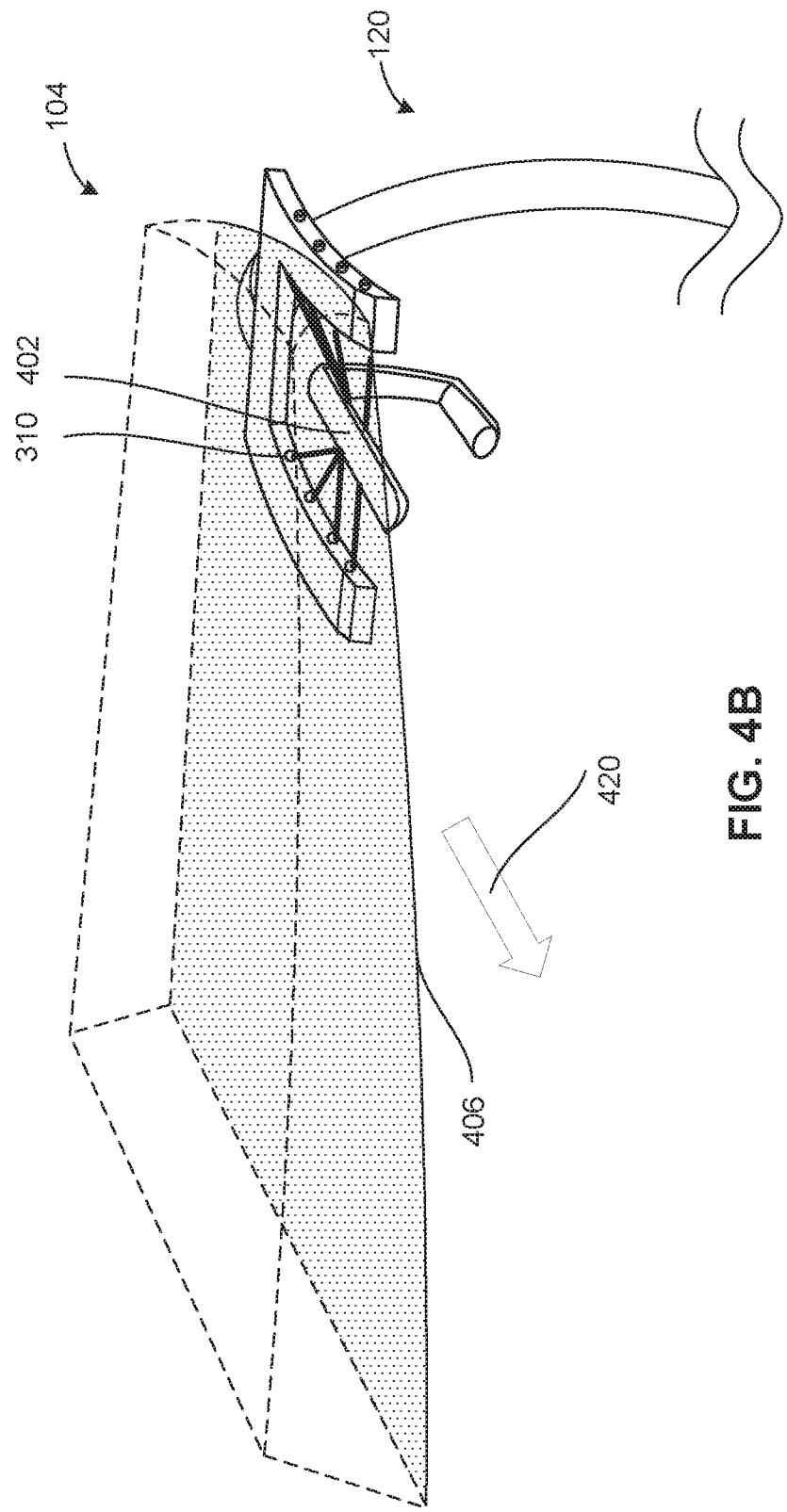

FIGS. 4A and 4B depict use of the braking stabilizer 120 shown in FIGS. 1 and 3. Turning to FIG. 4A, the braking stabilizer 120 is shown engaging a leading edge 404 of the wing 104. In the illustrated example, the stem 122 and the posts 304 of the flexible body 124 are elastically moved and/or displaced as the leading edge 404 contacts the braking stabilizer 120 (e.g., during a recoil action of the UAV 101 shown in FIG. 4D). Subsequent to contacting the leading edge 404, the flexible body 124 contacts and flexes along with a bottom surface 406 of the wing 104, as the wing moves along a direction generally indicated by an arrow 410, thereby defining a frictional interface therebetween. As a result, an amount of force applied to the UAV 101 during deceleration of the UAV 101 is reduced.

In this example, the wing 104 includes a hook (e.g., capture hook) 402 to be placed into contact and engage the flexible body 124 as the wing moves along a direction generally indicated by the arrow 410 during recovery of the UAV 101. The example hook 402 is generally c-shaped in this example and has not yet made contact with the flexible body 124 in the view of FIG. 4A even though the flexible body 124 has contacted the leading edge 404 and the bottom surface 406.

FIG. 4B depicts the hook 402 engaging the braking stabilizer 120. In particular, the hook 402 of the wing 104 has engaged the filaments 310 as the posts contact and slide against the bottom surface 406 while the wing 104 moves in a direction generally indicated by the arrow 420. In the illustrated example of FIG. 4B, the filaments 310 capture the hook 402 and, thus, the UAV 101. As a result, the UAV 101 is retained by the braking stabilizer 120, thereby preventing the UAV 101 from falling toward the ground, as occurs in some known implementations and, thus, reducing damage to the UAV 101 and increasing a longevity thereof.

Figure 5:
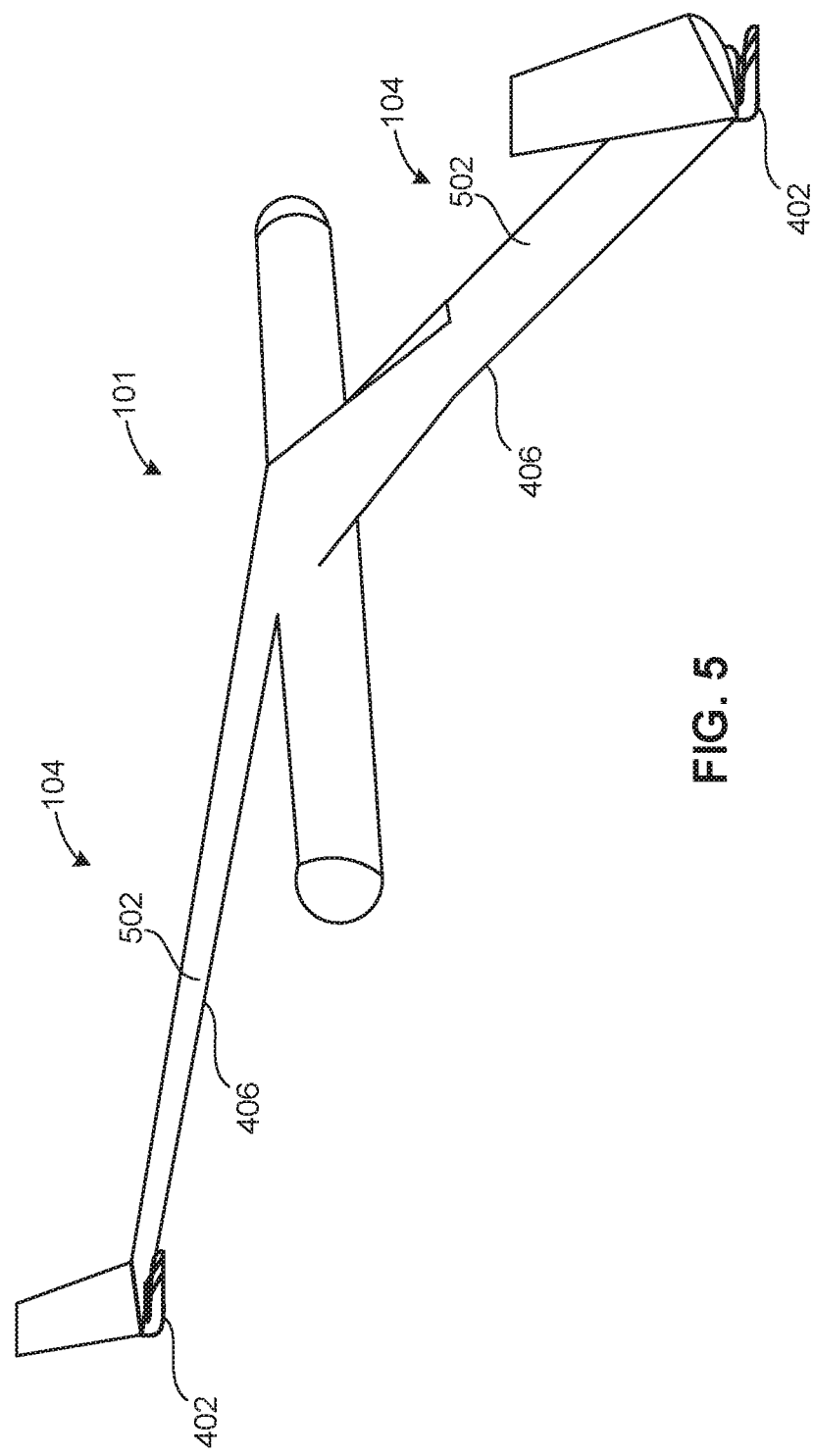
FIG. 5 is a detailed view of the example UAV shown in FIGS. 1-2D and 4A-4B.

FIG. 5 is a detailed view of the example UAV 101 shown in FIGS. 1-2D and 4A-4B. As can be seen in the illustrated example, the hooks 402 are placed on the bottom surfaces 406 of the wings 104. Further, the hooks are oriented so that their corresponding open ends face toward a direction of travel of the UAV 101. However, in some examples, only one of the hooks 402 is placed on one of the wings 104. Additionally or alternatively, the hooks 402 may be placed on an upper surface 502 of the wing 104. In such examples, the braking stabilizer 120 may be suspended instead of being supported from the ground, as shown in FIGS. 1, 3 and 4A-4B.

FIGS. 6A and 6B depict example capture hook implementations that can be implemented in examples disclosed herein. FIG. 6A is a detailed side view of the wing 104 with an open end of the hook 402 facing toward a direction of travel 601. In this example, the hook 402 is to be engaged with the flexible body 124 of the braking stabilizer 120 and captured by the filaments 310 as the UAV 101 travels in a forward direction (e.g., during an initial forward motion).

The hook 402 of the illustrated example is generally c-shaped and includes a mounting portion 602, a base 604, end portion (e.g., a distal end, a protruding end, etc.) 606 and a fulcrum 608. In this example, a cross-sectional area of the hook 402 between the base 604 and the end portion 606 generally decreases toward the end portion 606. In some examples, the end portion 606 includes a round 610. Additionally or alternatively, a lead-in chamfer is implemented onto the end portion 606. In some examples, the hook 402 includes a lock (e.g., a spring-loaded lock, a carabiner clip device, a retention lock, etc.) 612 to lock and/or retain at least one of the filaments 310 of the flexible body 124.

Turning to FIG. 6B, a detailed side view of the wing 104 is shown. In this particular example, the hook 402 is oriented for recovery during the recoil phase of the UAV 101 with the open end of the hook 402 facing a direction of rearward travel. In this example, the hook 402 contacts the flexible body 124 of the braking stabilizer 120 as the UAV 101 undergoes a rearward motion (e.g., during a recoil action), as generally indicated by an arrow 614.

Figure 7:
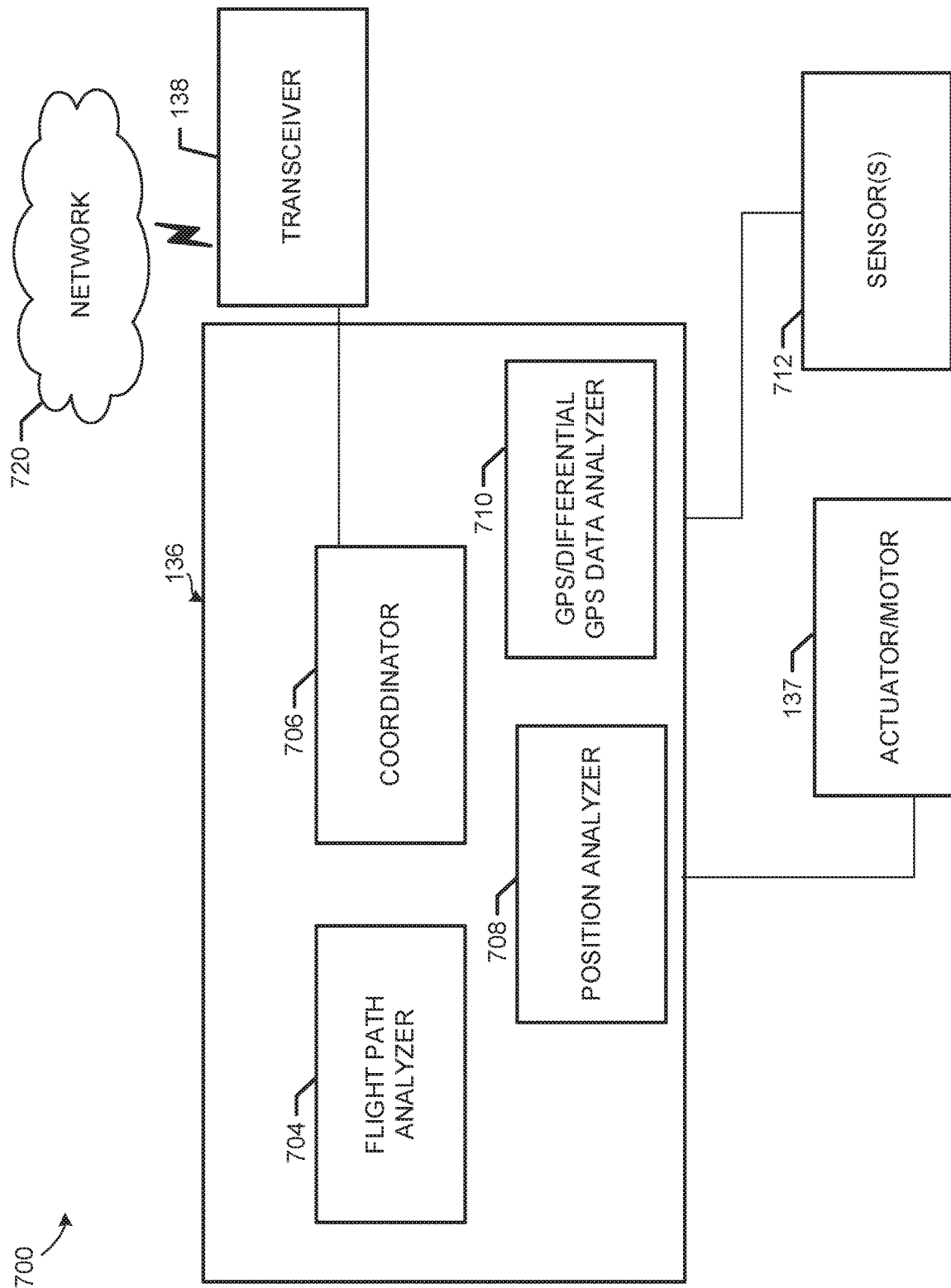
FIG. 7 is a schematic overview of a UAV recovery analysis system that can be implemented in examples disclosed herein.

FIG. 7 is a schematic overview of a UAV recovery analysis system 700 that can be implemented in examples disclosed herein. The UAV recovery analysis system 700 of the illustrated example includes the movement controller 136, the transceiver 138, and the actuator/motor 137. The example movement controller 136 includes a flight path analyzer 704, a coordinator 706, a position analyzer 708 and a GPS/differential GPS analyzer 710. Further, in this example, the movement controller 136 controls the transceiver 138. In some examples, the movement controller 136 is operatively and/or communicatively coupled to sensor(s) (e.g., an imaging sensor, a positional sensor, etc.) 712. Further, the transceiver 138 can be communicatively coupled to a network (e.g., a navigation network, a flight coordination network, etc.) 720.

In the illustrated example, the flight path analyzer 704 determines, estimates, interpolates, extrapolates and/or calculates a flight path of the UAV 101. In particular, the flight path analyzer 704 can determine an estimated flight path, trajectory and/or potential flight travel zone (e.g., a parametric flight path cone based on known flight data, a potential trajectory zone or area, etc.) of the UAV 101. In some examples, the flight path analyzer 704 utilizes data from the network 720. Additionally or alternatively, the example flight path analyzer utilizes data (e.g., positional data, image data, etc.) from the sensor(s) 712 and global positioning system (GPS) or differential GPS data from the GPS/differential GPS analyzer 710.

The example coordinator 706 calculates a movement of the UAV 101 and/or the braking stabilizer 120 based on the aforementioned flight path of the UAV 101 to facilitate recovery of the UAV 101. In some examples, the coordinator 706 directs and/or calculates movement of both the UAV 101 and the braking stabilizer 120 to increase a probability that the UAV 101 contacts the braking stabilizer 120.

The position analyzer 708 of the illustrated example analyzes movement of the UAV 101 to determine and/or increase a probability of contact of the UAV 101 with the braking stabilizer 120. In this example, the position analyzer 708 controls movement of the actuator/motor 137 based on sensor data from the sensor(s) 712 and/or GPS data associated with the GPS/differential GPS data analyzer 710.

In some examples, the GPS/differential GPS data analyzer 710 determines, predicts, interpolates and/or analyzes GPS data associated with the UAV 101 and/or the braking stabilizer 120. Additionally or alternatively, the GPS/differential GPS data analyzer 710 determines and/or analyzes GPS data associated with the braking stabilizer 120 and/or the UAV 101 to calculate positions thereof. In some such examples, the braking stabilizer 120 can include a GPS sensor and/or transponder mounted thereto. Additionally or alternatively, a relative position of the braking stabilizer 120 to the mast 112 is utilized to determine the position of the braking stabilizer 120.

While an example manner of implementing the UAV recovery analysis system 700 of FIG. 7 is illustrated in FIG. 7, one or more of the elements, processes and/or devices illustrated in FIG. 7 may be combined, divided, re-arranged, omitted, eliminated and/or implemented in any other way. Further, the example flight path analyzer 704, the example coordinator 706, the example position analyzer 708, the example GPS/differential GPS data analyzer 710 and/or, more generally, the example UAV recovery analysis system 700 of FIG. 7 may be implemented by hardware, software, firmware and/or any combination of hardware, software and/or firmware. Thus, for example, any of the example flight path analyzer 704, the example coordinator 706, the example position analyzer 708, the example GPS/differential GPS data analyzer 710 and/or, more generally, the example UAV recovery analysis system 700 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, flight path analyzer 704, the example coordinator 706, the example position analyzer 708, and/or the example GPS/differential GPS data analyzer 710 is/are hereby expressly defined to include a non-transitory computer readable storage device or storage disk such as a memory, a digital versatile disk (DVD), a compact disk (CD), a Blu-ray disk, etc. including the software and/or firmware. Further still, the example UAV recovery analysis system 700 of FIG. 7 may include one or more elements, processes and/or devices in addition to, or instead of, those illustrated in FIG. 7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
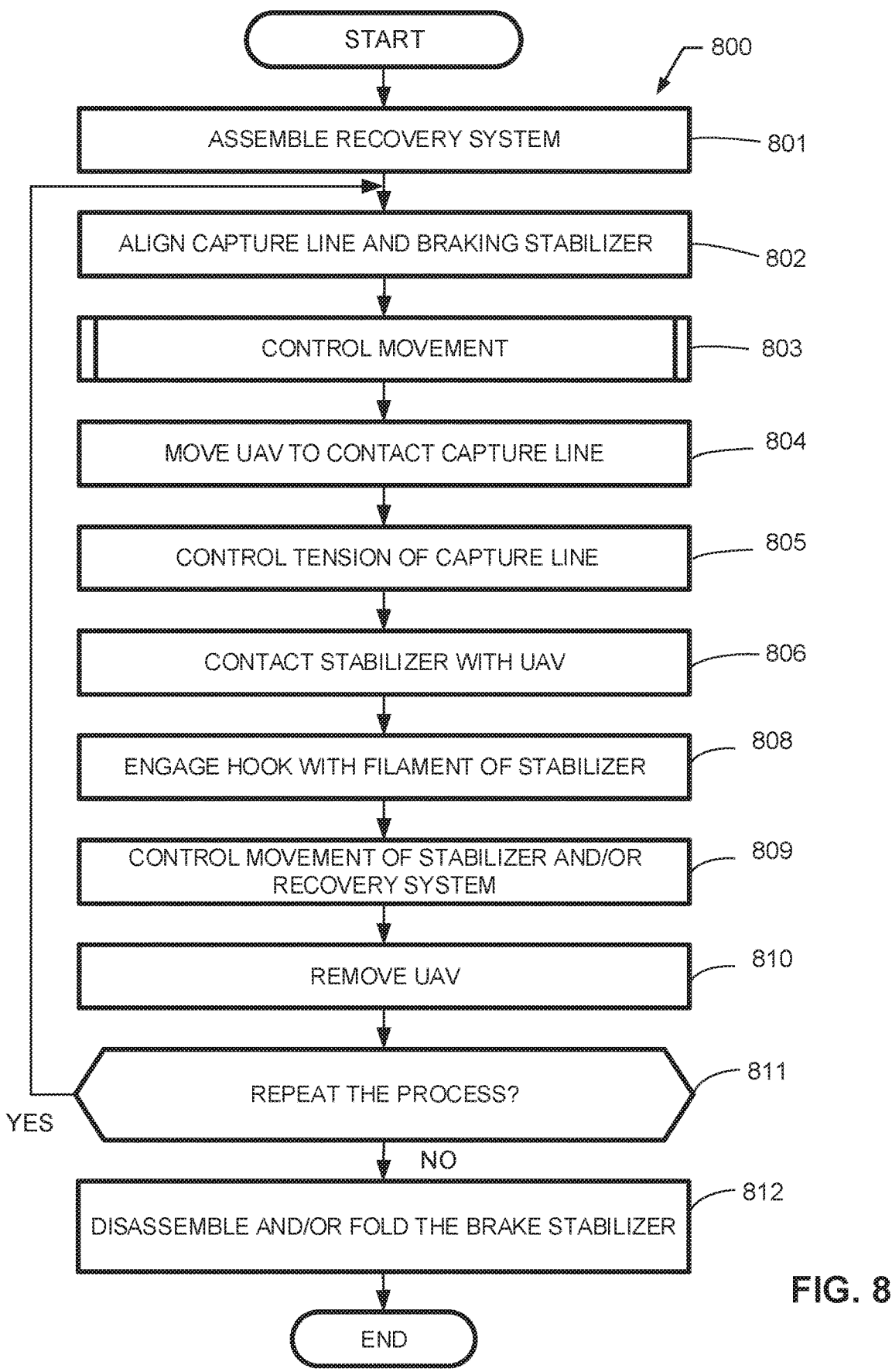
FIG. 8 is a flowchart representative of an example method to implement the example UAV recovery system of FIG. 1 and/or the UAV recovery analysis system of FIG. 7.
Figure 9:
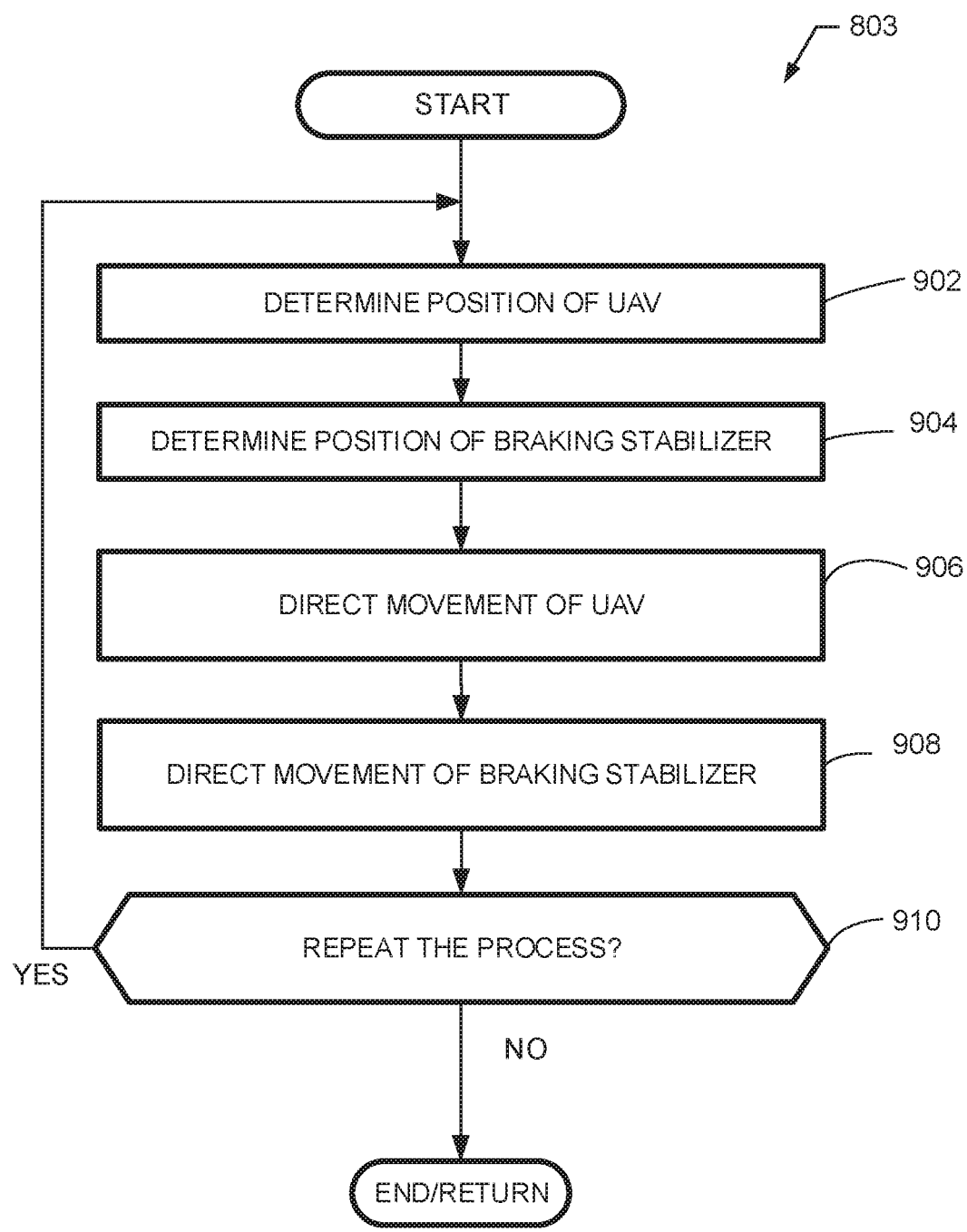
FIG. 9 is a flowchart representative of an example subroutine of the example method of FIG. 8.

Flowcharts representative of example hardware logic, machine readable instructions, hardware implemented state machines, and/or any combination thereof for implementing the UAV recovery analysis system 700 of FIG. 7 is shown in FIGS. 8 and 9. The machine readable instructions may be one or more executable programs or portion(s) of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 8 and 9, many other methods of implementing the example UAV recovery analysis system 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 8 and 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 8 is a flowchart representative of an example method 800 to implement the example UAV recovery system 100 of FIG. 1 and/or the example UAV recovery analysis system 700 of FIG. 7. In this example, the UAV 101 is being recovered by the UAV recovery system 100 while the UAV 101 is in flight. In particular, the UAV 101 of the illustrated example is being guided toward the capture line 114 and/or the braking stabilizer 120.

At block 801, the recovery system 100 and the braking stabilizer 120 are assembled. In this example, the recovery system 100 is unfolded along with the braking stabilizer after being placed near a determined (e.g., predicted) recovery location of the UAV 101.

At block 802, the capture line 114 and the braking stabilizer 120 are aligned relative to one another for recovery of the UAV 101. In the illustrated example, the capture line 114 and the braking stabilizer are aligned based on predicted motions of the UAV 101. In particular, the flexible body 124 of the braking stabilizer 120 is aligned relative to the capture line so that the flexible body 124 contacts the wing 104 as the UAV 101 is being recovered with the capture line 114. In some examples, at least one of the capture line 114 and/or the braking stabilizer 120 is positioned based on an anticipated or planned flight path of the UAV 101.

At block 803, movement of the UAV 101 and/or the braking stabilizer 120 is controlled and/or coordinated by the coordinator 706. As will be discussed in greater detail below in connection with FIG. 9, the coordinator 706 can direct this movement based on determined positions of the UAV 101 and the braking stabilizer 120 (e.g., a position of the body 124 of the braking stabilizer 120).

At block 804, the UAV 101 is moved to contact the capture line 114. In this example, the UAV 101 is navigated so that a portion of the wing 104 contacts the capture line 114.

At block 805, a tension and/or position of the capture line 114 is adjusted and/or controlled by the coordinator 706. In this example, the tension is adjusted to reduce (e.g., eliminate) a positional mismatch between the capture line 114 and the UAV 101 (e.g., due to slack of the capture line 114). For example, the tension is adjusted to dynamically assist with the positioning of the UAV 101 to better interface with the braking stabilizer 120. Additionally or alternatively, in some examples, the tension is adjusted prior and/or during contact of the UAV 101 with the capture line 114. For example, if the UAV 101 is predicted to overshoot the braking stabilizer 120, the tension can be increased before the UAV 101 contacts the capture line 114 and/or while the UAV 101 is being slowed down by the capture line 114.

At block 806, the braking stabilizer 120 is brought into contact with the wing 104 of the UAV 101. In this example, the bottom surface 406 of the UAV 101 is brought into contact with the braking stabilizer 120, thereby bending (e.g., elastically bending) the stem 122 along with the flexible body 124 and, thus, decelerating the UAV 101.

At block 808, the hook 402 of the UAV 101 engages the filament 310 of the braking stabilizer 120. As a result, the UAV 101 remains coupled (e.g., removably coupled) to the braking stabilizer 120. In some examples, the lock 612 is used to retain the UAV 101 to the braking stabilizer 120, thereby dampening motion of the UAV 101. In some examples, the UAV 101 is coupled to the capture line 114 in addition to the braking stabilizer 120.

At block 809, the coordinator 706 controls movement of the braking stabilizer 120 and/or the capture line 114 to position the UAV 101 for removal.

At block 810, the UAV 101 is removed from the UAV recovery system 100.

At block 811, it is determined whether to repeat the process. If the process is to be repeated, control of the process returns to block 802. Otherwise, the process proceeds to block 812.

At block 812, the braking stabilizer 120 is disassembled and/or folded and the process ends. For example, the braking stabilizer 120 and/or the line capture portion 110 can be folded and stored for later deployment and/or recovery of the UAV 101. Additionally or alternatively, the UAV recovery system 100 is folded, disassembled and/or moved.

FIG. 9 is a flowchart representing the subroutine 803 of FIG. 8. In this example, movement of the UAV 101 is directed so that the hook 402 will contact the filament 310.

At block 902, the position analyzer 708 and/or the GPS/differential GPS analyzer 710 calculates and/or determines a position of the UAV 101. In some examples, the position is determined based on a flight path estimate made by the flight path analyzer 704, sensor data from the sensor(s) 712 and/or GPS data from the GPS/differential GPS analyzer 710.

At block 904, the position analyzer 708 and/or the GPS/differential GPS analyzer 710 determines a position of the braking stabilizer 120. For example, a position of the body 124 can be calculated using a relative position of the braking stabilizer 120 to the mast 112.

At block 906, the coordinator 706 and/or the position analyzer 708 directs movement of the UAV 101. In some examples, the UAV 101 is moved to align the braking stabilizer 120 (e.g., the body 124 of the braking stabilizer 120) with a surface and/or component of the UAV 101, such as the wing 104, for example, as the UAV 101 approaches the UAV recovery system 100.

At block 908, in some examples, the coordinator 706 and/or the position analyzer 708 directs movement of the braking stabilizer 120. In particular, the actuator/motor 137 can be directed to move and/or steer the wheels 134 to position the braking stabilizer 120 for recovery of the UAV 101. Additionally or alternatively, the coordinator 706 causes the braking stabilizer 120 to rotate, pivot and/or tilt to facilitate contact of the UAV 101 with the braking stabilizer 120.

At block 910, it is determined whether to repeat the process. If the process is to be repeated, control of the process returns to block 902. Otherwise, the process ends/returns. This determination may be based on whether the UAV 101 and/or a flight path of the UAV 101 is within a requisite threshold area to contact the braking stabilizer 120 and/or the capture line 114.

Figure 10:
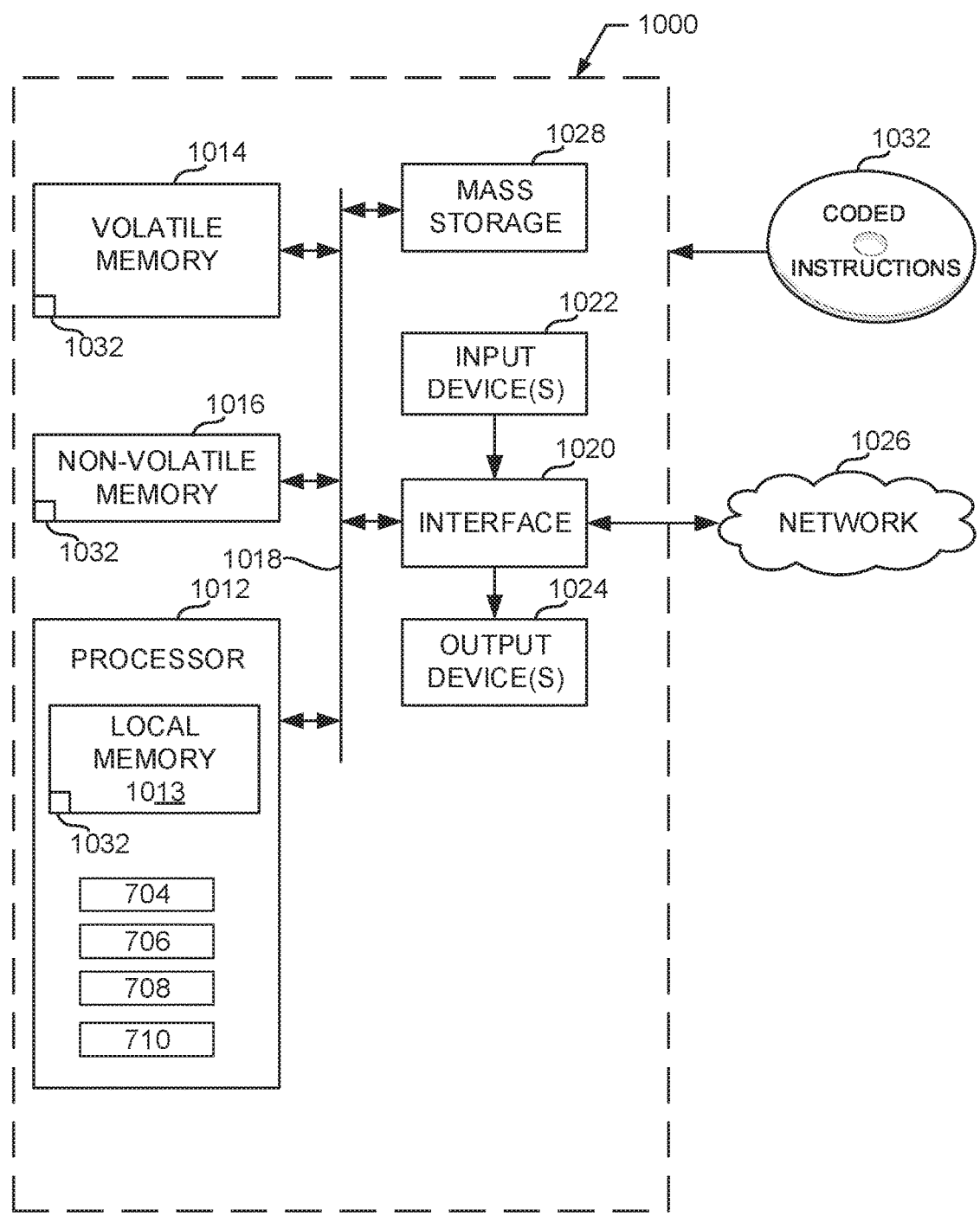
FIG. 10 is a block diagram of an example processing platform structured to execute the instructions of FIGS. 8 and 9 to implement the example UAV recovery system of FIG. 1 and/or the UAV recovery analysis system of FIG. 7.

FIG. 10 is a block diagram of an example processor platform 1000 structured to execute the instructions of FIGS. 8 and 9 to implement the UAV recovery analysis system 700 of FIG. 7. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example flight path analyzer 704, the example coordinator 706, the example position analyzer 708 and the example GPS/differential GPS data analyzer 710.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., with sensor/actuation systems, computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 8 and 9 may be stored in the mass storage device 1028, in the volatile memory 1014, in the non-volatile memory 1016, and/or on a removable non-transitory computer readable storage medium such as a CD or DVD.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Example 1 includes an apparatus to stabilize and recover an unmanned aerial vehicle (UAV) having a capture line, a mast to support the capture line for contact with the UAV, and a braking stabilizer. The braking stabilizer includes a flexible stem, a body at a distal end of the stem, the body defining first and second flexible posts, and a filament extending between the first and second posts to contact and engage a hook of the UAV.

Example 2 includes the apparatus as defined in example 1, wherein the body includes a relatively flat surface to contact and engage a wing of the UAV.

Example 3 includes the apparatus as defined in any of examples 1 or 2, where the first and second posts extend along a longitudinal direction of the stem.

Example 4 includes the apparatus as defined in any of examples 1 to 3, where the filament is at least partially composed of an elastomer.

Example 5 includes the apparatus as defined in any of examples 1 to 4, further including a movement controller to direct movement of the braking stabilizer based on a flight path of the UAV.

Example 6 includes the apparatus as defined in example 5, where the movement controller is to cause movement of at least one of a motor or an actuator operatively coupled to wheels of the braking stabilizer.

Example 7 includes the apparatus as defined in any of examples 1 to 6, further including a telescoping arm operatively coupled between the mast and the braking stabilizer.

Example 8 includes the apparatus as defined in any of examples 1 to 7, further including an actuator to rotate or tilt the stem of the braking stabilizer.

Example 9 includes a braking stabilizer for stabilization of an unmanned aerial vehicle (UAV) during recovery thereof. The braking stabilizer includes a flexible stem, a body at a distal end of the stem, flexible first and second posts of the body extending along a longitudinal direction of the flexible stem, and a filament extending between the first and second posts to contact a hook of the UAV.

Example 10 includes the braking stabilizer as defined in example 9, further including a lead-in chamfer positioned on at least one of the first or second posts.

Example 11 includes the braking stabilizer as defined in any of examples 9 or 10, where the body includes a chamfer between the stem and the first and second posts.

Example 12 includes the braking stabilizer as defined in any of examples 9 to 11, where the body is generally c-shaped.

Example 13 includes the braking stabilizer as defined in any of examples 9 to 12, where the filament includes a first filament, and further including a second filament arranged parallel to the first filament.

Example 14 includes a method of recovering an unmanned aerial vehicle (UAV). The method includes moving the UAV to contact a capture line, contacting a body of a braking stabilizer with the UAV, where the body includes first and second flexible posts extending therefrom, and engaging a hook of the UAV with a filament of the braking stabilizer to capture the UAV, where the filament extending between the first and second posts.

Example 15 includes the method as defined in example 14, further including causing a relatively flat surface of the body to contact the UAV prior to the hook engaging the filament.

Example 16 includes the method as defined in any of examples 14 or 15, further including locking, via a lock, the hook to the filament to retain the UAV to the braking stabilizer.

Example 17 includes the method as defined in example 16, where the hook is to be locked to the filament via a spring-loaded lock or a carabiner device.

Example 18 includes the method as defined in any of examples 14 to 17, where the contacting the body with the UAV occurs during a recoil action of the UAV associated with the UAV contacting the capture line.

Example 19 includes the method as defined in any of examples 14 to 18, where contacting the body with UAV includes contacting a top surface of a wing of the UAV.

Example 20 includes the method as defined in any of examples 14 to 19, further including coordinating, by instructions executed with at least one processor, movement of the braking stabilizer.

Example 21 includes the method as defined in example 20, further including directing, by instructions executed with the at least one processor, movement of at least one of a motor or actuator operatively coupled to the braking stabilizer based on a position of the UAV.

Example 22 includes a non-transitory machine readable medium comprising instructions, which when executed, cause a processor to at least determine a position of an unmanned aerial vehicle (UAV), determine a position of a braking stabilizer, where the braking stabilizer includes a flexible stem and a body having first and second flexible posts, and where the first and second flexible posts have a filament extending therebetween, and direct movement of at least one of the UAV or the braking stabilizer to bring the UAV in contact with the body so that a hook of the UAV is captured by the filament when the UAV contacts a capture line.

Example 23 includes the non-transitory machine readable medium as defined in example 22, where the instructions cause the processor to position the braking stabilizer relative to a mast supporting a capture line for recovery of the UAV.

Example 24 includes the non-transitory machine readable medium as defined in example 23, where the instructions cause the processor to direct movement of a telescoping arm disposed between the mast and the braking stabilizer.

Example 25 includes the non-transitory machine readable medium as defined in any of examples 22 to 24, where the instructions cause the processor to coordinate movement of the UAV with the braking stabilizer based on the position of the UAV and the position of the braking stabilizer.

Example 26 includes the non-transitory machine readable medium as defined in any of examples 22 to 25, where the instructions cause the processor to vary at least one of a tension or a position of the capture line.

Example 27 includes a system having a capture line to engage a first wing of an unmanned aerial vehicle (UAV), and a braking stabilizer to engage a second wing of the UAV, where the second wing is opposite the first wing. The braking stabilizer includes a flexible stem extending from a platform, and a body formed proximate to an end of the flexible stem, where the body has at least one feature to engage the second wing.

From the foregoing, it will be appreciated that example methods, apparatus and articles of manufacture have been disclosed that enable controlled stabilization of UAV recovery systems. Examples disclosed herein enable reduced (e.g., minimized) forces to act upon a UAV as the UAV is being recovered. Examples disclosed herein can also effectively account for variability of flight (e.g., due to wind conditions, erratic movements, etc.) of the UAV for capture thereof.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure. While examples disclosed herein are shown in the context of UAVs, examples disclosed herein can be applied to any appropriate other type of aircraft (e.g., manned aircraft) or vehicles (e.g., watercraft, submersibles, spacecraft, etc.).

What is claimed is:

1. An apparatus to stabilize and recover an unmanned aerial vehicle (UAV), the apparatus comprising:
   a capture line;
   a mast to support the capture line for contact with a first wing of the UAV; and
   a braking stabilizer including:
      a flexible stem spaced apart the capture line,
      a body at a distal end of the stem, the body defining first and second flexible posts extending therefrom to contact a second wing of the UAV, the first and second flexible posts configured to flex when the first and second flexible posts contact the second wing of the UAV, and
      a filament extending between the first and second posts to contact and engage a hook of the second wing of the UAV.

2. The apparatus as defined in claim 1, wherein the first and second posts extend along a longitudinal direction of the stem.

3. The apparatus as defined in claim 1, wherein the filament is at least partially composed of an elastomer.

4. The apparatus as defined in claim 1, further including a movement controller to direct movement of the braking stabilizer based on a flight path of the UAV.

5. The apparatus as defined in claim 4, wherein the movement controller is to cause movement of at least one of a motor or an actuator operatively coupled to wheels of the braking stabilizer.

6. The apparatus as defined in claim 1, further including a telescoping arm operatively coupled between the mast and the braking stabilizer.

7. The apparatus as defined in claim 1, further including an actuator to rotate or tilt the stem of the braking stabilizer.

8. A braking stabilizer for stabilization of an unmanned aerial vehicle (UAV) during recovery thereof, the braking stabilizer comprising:
   a flexible stem spaced apart from a capture line, the capture line to contact a first wing of the UAV;
   a body at a distal end of the stem;
   flexible first and second posts of the body extending from the body along a longitudinal direction of the flexible stem, the first and second flexible posts configured to flex when the first and second flexible posts contact a second wing of the UAV; and
   a filament extending between the first and second posts to contact a hook of the second wing of the UAV in response to the first and second posts contacting the second wing.

9. The braking stabilizer as defined in claim 8, further including a lead-in chamfer positioned on at least one of the first or second posts.

10. The braking stabilizer as defined in claim 8, wherein the body includes a chamfer between the stem and the first and second posts.

11. The braking stabilizer as defined in claim 8, wherein the body is generally c-shaped.

12. The braking stabilizer as defined in claim 8, wherein the filament includes a first filament, and further including a second filament arranged parallel to the first filament.

13. A method of recovering an unmanned aerial vehicle (UAV), the method comprising:
   moving the UAV to contact a capture line with a first wing of the UAV;
   contacting a body of a braking stabilizer with the UAV, the braking stabilizer spaced apart from the capture line, the body including first and second flexible posts extending therefrom to contact a second wing of the UAV, the first and second flexible posts configured to flex when the first and second flexible posts contact the second wing of the UAV; and
   engaging a hook of the second wing of the UAV with a filament of the braking stabilizer to capture the UAV, the filament extending between the first and second posts.

14. The method as defined in claim 13, further including locking, via a lock, the hook to the filament to retain the UAV to the braking stabilizer.

15. The method as defined in claim 14, wherein the hook is to be locked to the filament via a spring-loaded lock or a carabiner device.

16. The method as defined in claim 13, wherein the contacting the body with the UAV occurs during a recoil action of the UAV associated with the UAV contacting the capture line.

17. The method as defined in claim 13, wherein contacting the body with the UAV includes contacting a top surface of a wing of the UAV.

18. The method as defined in claim 13, further including coordinating, by instructions executed with at least one processor, movement of the braking stabilizer.

19. The method as defined in claim 18, further including directing, by instructions executed with the at least one processor, movement of at least one of a motor or actuator operatively coupled to the braking stabilizer based on a position of the UAV.

20. A non-transitory machine readable medium comprising instructions, which when executed, cause a processor to at least:
   determine a position of an unmanned aerial vehicle (UAV);
   determine a position of a braking stabilizer, the braking stabilizer including: (i) a flexible stem spaced apart from a capture line that is supported by a mast, the capture line to contact a first wing of the UAV and (ii) a body at a distal end of the flexible stem, the body having first and second flexible posts extending therefrom to contact a second wing of the UAV, the first and second flexible posts configured to flex when the first and second flexible posts contact the second wing of the UAV, the first and second flexible posts having a filament extending therebetween; and
   direct movement of at least one of the UAV or the braking stabilizer to bring the UAV in contact with the body so that a hook of the second wing of the UAV is captured by the filament after the hook of the UAV contacts and engages the capture line.

21. The non-transitory machine readable medium as defined in claim 20, wherein the instructions cause the processor to position the braking stabilizer relative to the mast supporting the capture line for recovery of the UAV.

22. The non-transitory machine readable medium as defined in claim 21, wherein the instructions cause the processor to direct movement of a telescoping arm disposed between the mast and the braking stabilizer.

23. The non-transitory machine readable medium as defined in claim 20, wherein the instructions cause the processor to coordinate movement of the UAV with the braking stabilizer based on the position of the UAV and the position of the braking stabilizer.

24. The non-transitory machine readable medium as defined in claim 20, wherein the instructions cause the processor to vary at least one of a tension or a position of the capture line.

25. A system comprising:
a capture line to engage a first wing of an unmanned aerial vehicle (UAV); and
a braking stabilizer to engage a second wing of the UAV, the second wing opposite the first wing, the braking stabilizer including:
   a flexible stem extending from a platform, the flexible stem spaced apart from the capture line,
   a body formed proximate to an end of the flexible stem, the body having first and second flexible posts extending therefrom to contact the second wing of the UAV, the first and second flexible posts configured to flex when the first and second flexible posts contact the second wing of the UAV, and
   a filament extending between the first and second posts to contact and engage a hook of the second wing of the UAV.

26. The system as defined in claim 25, further including a movement controller to direct movement of the braking stabilizer based on a flight path of the UAV.

27. The system as defined in claim 26, further including at least one of a motor or an actuator operatively coupled to wheels to move the braking stabilizer toward the UAV based on the flight path.

* * * * *